3,116,150
PROCESS OF AGGLOMERATING PULVERULENT FLOW-CONTAINING FOOD MIXES
Joseph S. Baker, Cincinnati, Ohio, assignor to The Procter & Gamble Company, Cincinnati, Ohio, a corporation of Ohio
No Drawing. Filed Jan. 19, 1962, Ser. No. 167,426
3 Claims. (Cl. 99—94)

This invention relates to the agglomeration of pulverulent materials, and more particularly, to the agglomeration of food particles to provide a free-flowing product having an improved wettability and dispersibility in aqueous systems.

In recent years there has been a trend toward providing the consumer with ready-to-use products having various built-in convenience and time-saving qualities. This has been particularly notable in the culinary arts such as in the field of the prepared mixes of one sort or another.

For example, it is now possible for household consumers, as well as commercial bakeries, to prepare baked goods from prepared mixes which contain many of the essential ingredients of the finished food product in a pre-mixed condition.

Frequently however, the prepared food mixes contain ingredients which are not readily dispersible in aqueous systems, such as in a cake batter. One of the important ingredients which is usually incorporated in a cake batter is flour. However, it is well known that fine particles of flour commonly wet with difficulty upon admixture with water, and form unwetted lumps in the cake batter instead of a smooth mixture. A means for providing improved wettability and dispersibility of such difficultly soluble food materials would find much use in the culinary arts.

Accordingly, it is a primary object of this invention to provide a free-flowing culinary mix having improved wettability and dispersibility in aqueous systems.

Still another object is to provide an improved process for combining the various ingredients of a prepared-mix into aggregates to prevent their mechanical segregation into layers of particles of differing sizes and densities during storage or other handling.

A further object is to provide a simplified agglomerating method which allows considerable latitude in process variables so that a great variety of materials can be agglomerated thereby.

Briefly stated, the process of this invention comprises moistening the pulverulent food particles with a fine spray of fluid having a temperature substantially less than its vaporizing temperature, thoroughly commingling the moistened particles in a non-vigorous, randomized, intimate, solid-to-solid manner with a relatively light tumbling force sufficient to gently roll up the particles into loose aggregates, and drying to provide a final mix in the form of a free-flowing wettable product having a larger average particle size than the unagglomerated constituent particles.

By means of the aforesaid agglomerating process, it is possible to provide free-flowing highly wettable and dispersible prepared mixes having a great variety of ingredients. For example, among those materials which can be agglomerated by the process of this invention are cake mixes containing flour, sugar, shortening, and other ingredients; pancake mixes, confectionery mixes; powdered beverages; and other pulverulent substances in general.

While various agglomerating processes recently have been proposed for the formation of aggregates, they have not provided a satisfactory product for use with mixtures containing high proportions of flour. Most of the prior art agglomerating methods produce an excessively forceful inter-particle contact with insufficient randomized commingling. Moreover, the elevated temperatures which are frequently used tend to produce undesirable changes in the constituents of flour. Such conditions have failed to produce an aggregate having desirable wettability and dispersibility in water. Conversely, the present process has been found to be particularly suitable for mixtures containing relatively high proportions of flour and other ingredients which are normally difficultly soluble in aqueous systems.

It has been found that a particular mode of commingling the pulverulent particles provides a superior agglomerated product. The method consists of causing the moistened particles to tumble and adhere to each other by the impact of a relatively light inter-particle force.

While various types of apparatus can be devised for producing the said inter-particle contact, a tumbling cylinder mounted on a horizontal, or slightly inclined, axis and slowly rotating thereon has been found to be particularly suitable. In this manner the moistened particles can gently roll up upon each other within the cylinder as it is being slowly revolved.

Another satisfactory device for producing a light inter-particle collision force is a gently agitated, fluidized bed onto which the moistening-fluid can be sprayed from above.

During the tumbling process it is desirable to avoid an inter-particle collision such as would be produced by forcing the particles together by a highly pressurized stream of gas or liquid. In those cases where the particles are commingled by agitating a bed of material, the thickness of the bed should be regulated to prevent an excessive inter-particle force caused by the mass of the overlying material.

For example, in the use of a tumbling cylinder mounted on a horizontal axis for agglomerating prepared mixes comprising about 70–90% flour, 0–7% shortening, 5–20% sugar and small amounts of other ingredients, it has been found to be important to use a relatively thin bed of material. Thus, a bed of material having a maximum depth of about 2–4 inches thick when at rest in the cylinder has been found to be satisfactory for a cylinder having a diameter of about 2 feet.

In order to prevent an excessive inter-particle collision force, it is also desirable to rotate the tumbling cylinder on its axis at a low speed and avoid the use of high-speed mixing in general. The use of several longitudinal baffles, an inch or two in height, for example, in a 2 foot diameter cylinder, may at times assist in the gentle rolling-up of the particles upon each other.

In the use of a tumbling cylinder mounted on a horizontal axis it is desirable to provide a cylinder rotating speed sufficient to cause the bed of particles to rise slightly up the inner wall of the cylinder so that the particles will continuously roll up and over each other in a solidto-solid manner without thereby producing an excessive cascading effect which causes the particles to fall freely through the air, although a small amount of such cascading is not harmful.

As an example, in the agglomeration of culinary mixes comprising about 70–90% flour, 0–7% shortening, 5–20% sugar and small amounts of other ingredients, it has been found desirable to use a cylinder having a diameter of about 2 feet and a rotating speed of about 5 to about 50 r.p.m.

The use of a tumbling means in the aforesaid described manner provides for a high probability of contact between the particles without thereby producing a hard compaction. It has been found that a loosely-compacted porous aggregate provides for greater wettability and dispersibility than a relatively hard compaction. However, the compaction should not be so loose that it cannot withstand subsequent moderate handling and packaging conditions without breakage.

The agglomerating equipment should be of such a type which will effectively distribute the moistening-fluid medium uniformly throughout the powdered mass. Insufficient distribution of moistening-fluid to the individual powdered particles prevents the attainment of the optimum relation between moisture content, density, particle size and aggregate structure that has been found necessary for maximum wettability and dispersibility.

A sufficient amount of moistening-fluid thoroughly distributed to the individual powdered particles is of particular importance in the agglomeration of food mixes containing substantial amounts of flour and/or shortening. For example, in the agglomeration of a culinary mix such as a pancake mix comprising about 70–90% flour, 0–7% shortening, 5–20% sugar and small amounts of other ingredients, it has been found desirable to increase the moisture content of the prepared mix solids to a level of about 17–23% in the agglomerating zone in order to maximize wettability and dispersibility without introducing undesirable batter or cake characteristics in the final product. With a culinary mix such as a cake mix comprising about 30–50% flour, 5–20% shortening, 30–50% sugar and small amounts of other ingredients, the moisture content should be raised to about 5–9%. However, the amount of fluid used is determined, in part, by the relative proportion of the various ingredients of the mix. A more soluble mix generally tends to require less moistening fluid than a less soluble mix.

Although part of the moistening-fluid can be added to the mix before it is tumbled, it is preferable to add the fluid while the tumbling is in progress. The most satisfactory method of applying the moistening-fluid is by means of spraying through an atomizing nozzle. A fine spray applied to the slowly tumbling mix provides a thorough dispersal of a sufficient amount of fluid to the individual powdered particles without producing an overly forceful inter-particle collision.

A satisfactory moistening-fluid for purposes of this invention is water. However, other fluids which tend to dissolve or soften some of the ingredients of the particles and cause the particles to become sticky and adhere together are usable. Examples of such fluids, in addition to water, are water miscible alcohols such as ethyl alcohol and isopropyl alcohol, and other organic solvents such as hexane and acetone.

The temperature of the moistening-fluid should be kept sufficiently low, preferably at substantially less than its vaporizing temperature, so that no undesirable changes take place in the chemical and physical structure of the ingredients of the powdered material, such as gelatinization of the starch in flour or the degradation of proteins or enzymes and the like. Elevated temperatures of the moistening-fluid or of the agglomerating zone should be avoided for the further reason that they tend to soften the particles excessively and cause them to become too tightly compacted together with a consequent loss in wettability and dispersibility of the final agglomerated product. Satisfactory results are obtained in the agglomeration of powdered foods containing flour, sugar and shortening by spraying water at tap temperature, as for example from 50° to 70° F., onto the tumbling particles, although temperatures up to about 125° F. will not significantly interfere with the desired improvements in wettability and dispersibility.

The aforesaid fluids are not sticky materials or binding substances in and of themselves; rather, they are non-cohesive adjuvants which facilitate the self-adhesion of the constituent food particles. At times it may also be desirable to use a sticky binding fluid to cause the particles to adhere together.

After the material has been agglomerated, the added fluid-moisture is usually removed so that the final dried product preferably has a moisture content which approximates that of the initial unagglomerated mix, or which is otherwise comparable to the moisture content normally associated with flour-containing prepared mixes of the type herein described. The amount of moisture to be removed may at times depend somewhat upon the nature and extent of further processing steps, the expected storage conditions or other subsequent treatment or usage of the agglomerated product. While the method of drying is not critical, and in some instances may be dispensed with altogether, it is important to avoid the use of vigorous mechanical action during drying. The material should be gently handled to avoid breakage of the loose aggregates. The use of vacuum dryers, fluid-beds or forced draft ovens are satisfactory for purposes of this invention, although the skilled artisan may substitute other means of drying.

The following examples illustrate the process of this invention, but the invention is not limited to these specific examples.

*Example I*

A pancake mix was prepared by mixing together the following ingredients:

| | Weight percent |
|---|---|
| Wheat flour | 64.5 |
| Corn flour | 15.2 |
| Oat flour | 5.1 |
| Granulated sugar | 8.1 |
| Plasticized glyceride shortening | 5.0 |
| Salt | 1.8 |
| Coloring matter, minor amount. | |

The moisture content of the pancake mix solids was about 10% and the particle size ranged from 20 to 300 microns. The mix was subjected to a continuous agglomeration process in a rotating horizontal cylinder under the following conditions to provide a light tumbling force and a non-vigorous, randomized, intimate, solid-to-solid inter-particle contact:

| | |
|---|---|
| Length of agglomerating cylinder | 67 inches. |
| Inside diameter of agglomerating cylinder | 22 inches. |
| Cylinder speed | 11 r.p.m. |
| Feed rate of mix | 5 lbs./min. |
| Discharge rate of mix | 5 lbs./min. |
| Thickness of agglomerating bed of mix | 2½ to 3 inches. |
| Feed rate of spray | 4 lbs./min. |
| Water pressure of spray | 400 p.s.i.g. |

The dry mix was fed into one end of the rotating cylinder and discharged at the other end into a dryer. Water at room temperature was sprayed through an atomizing nozzle onto the bed of material as it was tumbled about the cylinder to produce a moisture content in the pancake mix solids of about 21–22% as it was discharged into the dryer. The added moisture was then removed by drying to provide a final product having a moisture content of about 10 percent.

The final dried material was free flowing and had improved wettability and dispersibility in water compared to the initial unagglomerated mixture. The particle size of the final product obtained from two runs of the aforesaid process is indicated by the screen analysis shown in the following table:

| Screen Size | Screen Analysis in Cumulative Percent | |
|---|---|---|
|  | Pancake Mix agglomerated to 21.7% moisture | Pancake Mix agglomerated to 22% moisture |
| On 20 Tyler Mesh | 3 | 8 |
| On 28 Tyler Mesh | 23–24 | 34–36 |
| On 48 Tyler Mesh | 81–82 | 82–83 |
| On 65 Tyler Mesh | 99.9 | 99 |

In comparison with the final product, the bulk of the initial unagglomerated particles passed through a 65 mesh screen.

*Example II*

A pancake mix was prepared by mixing together the following ingredients:

| | Weight percent |
|---|---|
| Wheat flour | 71.8 |
| Oat flour | 7.0 |
| Granulated sugar | 15.0 |
| Salt | 2.0 |
| Sodium bicarbonate | 1.8 |
| Monocalcium phosphate | 2.2 |

Flavoring, minor amount.
Coloring, minor amount.

A 10-lb. batch of the said mix was sprayed with room temperature water and simultaneously tumbled in an inclined rotating cylindrical chamber having an I.D. of about 20 inches, a length of about 20 inches, and a pitch of about 15° from a horizontal plane. The water, under a pressure of 1000 p.s.i., was sprayed onto the mix from an atomizing nozzle for about 1 minute while the cylinder was being rotated at a speed of about 50 r.p.m. to produce an agglomerated mix having a total moisture content of about 13.5%. The said conditions produced a light tumbling force and an intimate solid-to-solid inter-particle contact. The added moisture was then removed by drying the agglomerated mix on trays in a forced draft oven at 120–125° F. The said process was repeated 3 times, each time with a separate batch of mix and for a period of time exceeding by one minute the preceding trial.

The final dried products consisted of free-flowing, dustless, and loosely compacted aggregates.

The moisture content of the undried agglomerated mix and the density of the final dried product obtained by the aforesaid process as the agglomerating time was varied from 1 to 4 minutes is shown in the following table:

| Agglomerating Time (min.) | Moisture Content of Undried Agglomerated Mix, Percent | Density of Final Dried Product, g./cc. |
|---|---|---|
| 0 (control product) | 10.0 | .825 |
| 1 | 13.5 | .78 |
| 2 | 17.0 | .675 |
| 3 | 20.6 | .61 |
| 4 | 24.0 | .645 |

The particle size of the dried product in comparison with the particle size of the initial unagglomerated mix is indicated in the following table by the screen analysis obtained with the said products:

| Agglomerating Time (min.) | Screen Analysis in Cumulative Percent | | | |
|---|---|---|---|---|
|  | On 14 Tyler Mesh | On 30 Tyler Mesh | On 60 Tyler Mesh | On 100 Tyler Mesh |
| 0 (control product) | 0 | 0.2 | 10.9 | 37.2 |
| 1 | 2.2 | 4.6 | 24.3 | 40.8 |
| 2 | 3.5 | 10.6 | 44.9 | 61.5 |
| 3 | 11.2 | 39.7 | 73.5 | 87.4 |
| 4 | 22.8 | 55.5 | 85.1 | 96.5 |

The improvements in pancake batter characteristics and eating quality of pancakes obtained from the aforesaid agglomerated mixes is shown in the following table. In each instance the pancakes were prepared from a pancake batter consisting of 260 g. of the mix having blended therein one egg, 1⅔ cups milk, and 2 tbsp. vegetable oil.

| Agglomerating Time (min.) | Batter Characteristics | | | | Pancake Eating Quality |
|---|---|---|---|---|---|
|  | Wetting | Lumping,* Percent | Viscosity | Graininess | |
| 0 (control product.) | Poor | 100 | Normal | None | Normal. |
| 1 | Slight improvement. | 40–50 | Large increase. | do | Do. |
| 2 | Rapid wetting. | 25 | Slight increase. | do | Do. |
| 3 | do | None | Normal | Slight | Do. |
| 4 | do | None | do | Marked | Gummy and somewhat coarse structure. |

*Based on control product as 100%.

The above tables indicate that an agglomerating treatment to provide a moisture content of the mix solids in the agglomerating zone of about 21% provides rapid wetting and complete removal of batter lumping without introducing undesirable batter characteristics or poor eating quality in the finished food product.

The pancake batters obtained from the said improved agglomerated mixes when allowed to rest for a normal cooking and eating interval of about 30 minutes had a stable viscosity as opposed to the gradual thickening of the batter prepared from the unagglomerated mix.

When hexane and ethyl alcohol are substituted for water as the agglomerating fluid in the above example, substantially the same results are obtained.

*Example III*

A yellow cake mix consisting of the following ingredients was agglomerated according to the procedure of Example II above, except that the water pressure of the spray was 1200 p.s.i. and the agglomerating time interval was varied from ½ to 1½ minutes.

| | Weight percent |
|---|---|
| Cake flour | 40.1 |
| Granulated sugar | 43.3 |
| Plastic glyceride shortening | 11.0 |
| Skim milk solids | 3.0 |
| Sodium bicarbonate | 0.7 |
| Monocalcium phosphate | 0.5 |
| Sodium acid pyrophosphate | 0.5 |
| Salt | 0.8 |

Flavor, minor amount.
Color, minor amount.

The moisture content of the agglomerated and undried mix and the density of the final dried product obtained by the said process is shown in the following table:

| Agglomerating Time (min.) | Moisture Content of Undried Agglomerated Mix, Percent | Density of Final Dried Product, g./cc. |
|---|---|---|
| 0 (control product) | 3.5 | .861 |
| ½ | 6.2 | .806 |
| 1 | 8.2 | .781 |
| 1¼ | 9.3 | .775 |
| 1½ | 10.3 | .833 |

The particle size of the final dried product as indicated by the screen analysis obtained therefrom is shown in the following table:

| Agglomerating Time (min.) | Screen Analysis in Cumulative Percent | | | |
|---|---|---|---|---|
| | On 14 Tyler Mesh | On 30 Tyler Mesh | On 60 Tyler Mesh | On 100 Tyler Mesh |
| ½ | 8.0 | 16.0 | 48.9 | 85.3 |
| 1 | 9.2 | 18.1 | 50.0 | 84.4 |
| 1¼ | 11.1 | 27.0 | 60.9 | 87.6 |
| 1½ | 28.9 | 58.1 | 78.9 | 93.1 |

In comparison with the final product, the bulk of the initial unagglomerated particles passed through a 100 mesh screen.

The improvements in cake batter characteristics obtained from the aforesaid agglomerated mixes is shown in the following table. In each instance the batter consisted of 270 g. of water and 96 g. of whole eggs blended with 540 g. of the agglomerated mix.

| Agglomerating Time (min.) | Batter Characteristics | |
|---|---|---|
| | Lumping | Texture |
| 0 (control product) | Some | Normal. |
| ½ | None | Slightly sandy. |
| 1 | ----do---- | Do. |
| 1¼ | ----do---- | Moderately sandy. |
| 1½ | ----do---- | Very sandy. |

The above tables indicate that an agglomeration treatment to provide about 6–8% moisture content in the mix solids in the agglomerating zone is sufficient for complete elimination of batter lumps and that a higher level of moisture tends to produce undesirable batter texture.

Cakes prepared from the aforesaid batters had normal eating qualities in terms of volume, texture, and flavor in the case of the said lower degree of agglomeration, but had slight losses in quality at the higher levels of agglomeration.

*Example IV*

An angel food "A" mix consisting of the following ingredients was agglomerated according to the procedure of Example II above, except that the pressure of the water spray was 1600 p.s.i. and the agglomerating time interval was varied from ½ to 1½ minutes.

Weight percent
Powdered sugar _____ 65.1
Dried egg white solids _____ 34.2
Monosodium phosphate _____ .6
Flavoring, minor amount.

The moisture content of the agglomerated mixes prior to drying and the density of the final dried product obtained by the process are shown in the following table:

| Agglomerating Time (min.) | Moisture Content of Undried Agglomerated Mix-Percent | Density of Final Dried Product g./cc. |
|---|---|---|
| 0 (control product) | 1.7 | .870 |
| ½ | 3.8 | .833 |
| 1 | 5.1 | .764 |
| 1½ | 8.3 | .616 |

The particle size of the final dried product as indicated by the screen analysis obtained therefrom is shown in the following table:

| Agglomerating Time (min.) | Screen Analysis in Cumulative Percent | | | |
|---|---|---|---|---|
| | On 14 Tyler Mesh | On 30 Tyler Mesh | On 60 Tyler Mesh | On 100 Tyler Mesh |
| ½ | 7.1 | 9.3 | 17.4 | 39.2 |
| 1 | 20.3 | 24.8 | 36.3 | 50.7 |
| 1½ | 46.5 | 62.2 | 79.7 | 91.2 |

In comparison with the final product, the bulk of the initial unagglomerated particles passed through a 100 mesh screen.

The improvements in batter characteristics obtained from the aforesaid agglomerated mixes is shown in the following table. In each instance the batter consisted of 320 g. of water blended into 210 g. of the mix. The blending of the mix was done with a "Sunbeam" electric mixer at 225 r.p.m. for about one minute, followed by whipping at 850 r.p.m.

| Agglomerating Time (min.) | Wetting Out Time, seconds | Lumping | Whipping Time, minutes |
|---|---|---|---|
| 0 (control product) | 40 | Some | 4 |
| ½ | 30 | None | 3½ |
| 1 | 15 | ---do--- | 3½ |
| 1½ | 10 | Sandy | 3½ |

The above table indicates that the agglomerating process clearly improves the wettability and whip time of the angel food "A" mix. Cakes prepared from the said mix blended with a standard angel food "B" mix comprising about 55% flour, 30% sugar, 14% starch, 1% leavening and minor amounts of flavoring had good eating qualities.

Although the invention has been described with particular reference to prepared-mixes such as cake and pancake mixes, the invention is not limited thereto; other pulverulent materials such as dry milk solids, flour particles, confectionery and beverage powders which are capable of being self-adherent upon being moistened and tumbled in the heretofore described manner are included within the scope of this invention.

What is claimed is:

1. The method of agglomerating pulverulent flour-containing food mixes adapted to be reconstituted with water preparatory to baking which comprises:

(a) substantially uniformly moistening the particles of the flour-containing mix with a finely atomized spray of water in an amount sufficient to increase the total content of moisture of the mix solids to a level of from about 5 to about 23 weight percent and thereby to cause the particles to become self-adherent without significant formation of poor eating qualities in the final product, (b) commingling the mass of particles in a bed having a depth not exceeding about 4 inches thick in a non-vigorous, randomized, intimate, solid-to-solid, substantially non-free-falling manner with a light tumbling force within a substantially horizontally disposed cylinder rotating about its longitudinal axis at a speed of from about 5 to about 50 r.p.m. and sufficient to roll up the particles upon each other into loose aggregates having a larger average particle size than the unagglomerated, constituent particles, and (c) drying to provide a loosely aggregated free-flowing product characterized by high wettability and dispersibility in aqueous systems, said moistening, commingling, and drying being conducted at temperatures of from about 50° F. to about 125° F.

2. The method of agglomerating a pulverulent pancake mix comprising about 70–90 weight percent flour, 0–7 weight percent shortening, and 5–20 weight percent sugar which comprises:

(a) susbtantially uniformly moistening the particles with a finely atomized spray of water in an amount sufficient to increase the moisture content of the mix solids to about 17–23 weight percent and thereby to cause the particles to become self-adherent without significant formation of poor eating qualities in the final product, (b) commingling the mass of particles in a bed having a depth not exceeding about 4 inches thick in a non-vigorous, randomized, intimate, solid-to-solid, substantially non-free-falling manner with a light tumbling force within a substantially horizontally disposed cylinder rotating about its longitudinal axis at a speed of from about 5 to about 50 r.p.m. and sufficient to roll up the particles upon each other into loose aggregates having a larger average particle size than the unagglomerated, constituent particles, and (c) drying to provide a loosely aggregated free-flowing product characterized by high wettability and dispersibility in aqueous systems, said moistening, commingling, and drying being conducted at temperatures of from about 50° F. to about 125° F.

3. The method of agglomerating a pulverulent cake mix comprising about 30–50 weight percent flour, 5–20 weight percent shortening, and 30–50 weight percent sugar which comprises:

(a) substantially uniformly moistening the particles with a finely atomized spray of water in an amount sufficient to increase the moisture content of the mix solids to about 5–9 weight percent and thereby to cause the particles to become self-adherent without significant formation of poor eating qualities in the final product, (b) commingling the mass of particles in a bed having a depth not exceeding about 4 inches thick in a non-vigorous, randomized, intimate, solid-to-solid, substantially non-free-falling manner with a light tumbling force within a substantially horizontally disposed cylinder rotating about its longitudinal axis at a speed of from about 5 to about 50 r.p.m. and sufficient to roll up the particles upon each other into loose aggregates having a larger average particle size than the unagglomerated, constituent particles, and (c) drying to provide a loosely aggregated free-flowing product characterized by high wettability and dispersibility in aqueous systems, said moistening, commingling, and drying being conducted at temperatures of from about 50° F. to about 125° F.

References Cited in the file of this patent

UNITED STATES PATENTS

| | | |
|---|---|---|
| 2,436,771 | Hood | Feb. 24, 1948 |
| 2,893,871 | Griffin | July 7, 1959 |
| 2,957,771 | Prater et al. | Oct. 25, 1960 |
| 2,995,773 | Gidlow et al. | Aug. 15, 1961 |

UNITED STATES PATENT OFFICE
CERTIFICATE OF CORRECTION

Patent No. 3,116,150                                                December 31, 1963

Joseph S. Baker

It is hereby certified that error appears in the above numbered patent requiring correction and that the said Letters Patent should read as corrected below.

In the heading to the printed specification, line 2, for "FLOW" read -- FLOUR --; column 7, third table, first column, line 4 thereof, for "1/4" read -- 1-1/4 --.

Signed and sealed this 9th day of June 1964.

(SEAL)
Attest:

ERNEST W. SWIDER                                                  EDWARD J. BRENNER
Attesting Officer                                                      Commissioner of Patents